United States Patent
Ishino et al.

(10) Patent No.: US 8,035,576 B2
(45) Date of Patent: Oct. 11, 2011

(54) HEAD-MOUNTED DISPLAY AND HEAD-MOUNTED VIDEO DISPLAY

(75) Inventors: Toshiki Ishino, Hiratsuka (JP); Toshiyuki Okuma, Chofu (JP); Takaaki Nakabayashi, Kawasaki (JP); Yoshihiro Saito, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 12/026,226

(22) Filed: Feb. 5, 2008

(65) Prior Publication Data

US 2008/0198097 A1 Aug. 21, 2008

(30) Foreign Application Priority Data

Feb. 20, 2007 (JP) ................................. 2007-039820
Mar. 29, 2007 (JP) ................................. 2007-089043

(51) Int. Cl.
*G09G 5/00* (2006.01)
(52) U.S. Cl. ................. 345/8; 345/7; 359/630
(58) Field of Classification Search ................... 345/7–8
See application file for complete search history.

(56) References Cited

U.S. PATENT DOCUMENTS

| 5,151,722 | A | * | 9/1992 | Massof et al. | 351/158 |
| 5,170,153 | A | * | 12/1992 | Migozzi et al. | 345/8 |
| 5,768,025 | A | * | 6/1998 | Togino et al. | 359/633 |
| 6,646,809 | B1 | * | 11/2003 | Ishino et al. | 359/630 |

FOREIGN PATENT DOCUMENTS

| JP | 05-127660 | 5/1993 |
| JP | 08-149393 | 6/1996 |
| JP | 11-174988 | 7/1999 |
| JP | 3485689 | 10/2003 |
| JP | 2004-268638 | 9/2004 |

* cited by examiner

*Primary Examiner* — Richard Hjerpe
*Assistant Examiner* — Dorothy Harris
(74) *Attorney, Agent, or Firm* — Cowan, Liebowitz & Latman, P.C.

(57) ABSTRACT

To shield a frame area 203b, a frame-like shield member 501 is superimposed over an LCD 203 while being separated from the LCD 203 by a distance L. The distance L satisfies $$L < 2 \times (B-A) \times f/D$$

where f is a focal length of an optical system, D is a human pupil diameter determined statistically in advance, B is a width of the frame area, and A is a value determined statistically in advance as a width which will not be able to be shielded on a side of the frame area to be shielded by a side of the shield member.

5 Claims, 13 Drawing Sheets

F I G. 3A
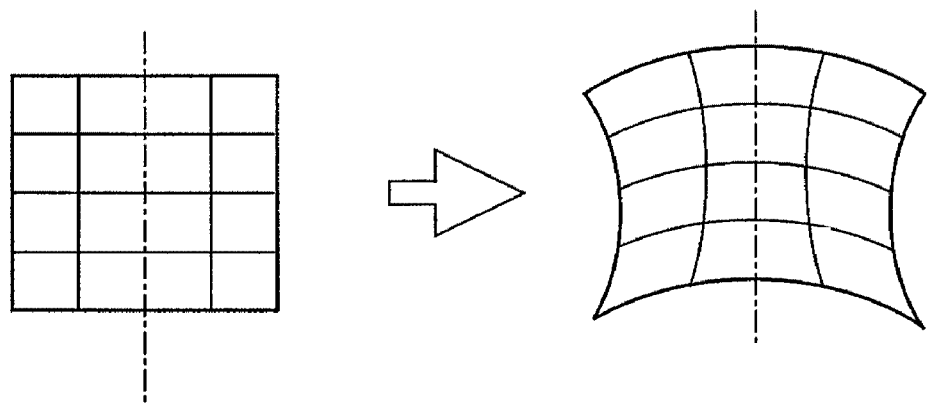
F I G. 3B
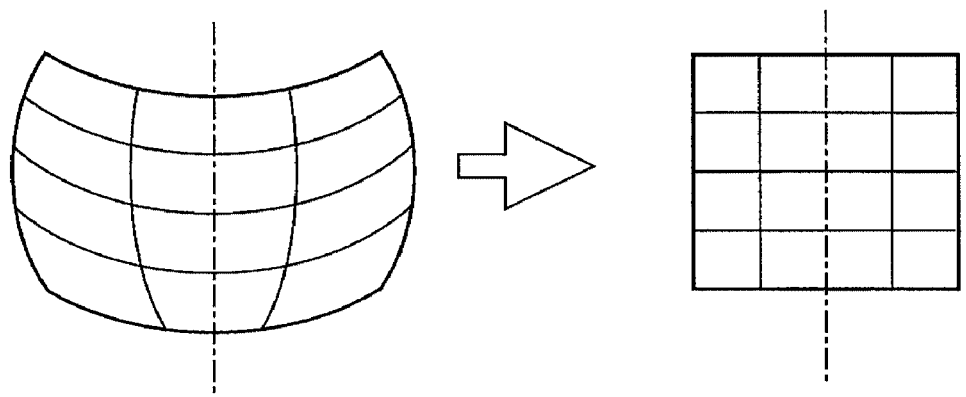

F I G. 7
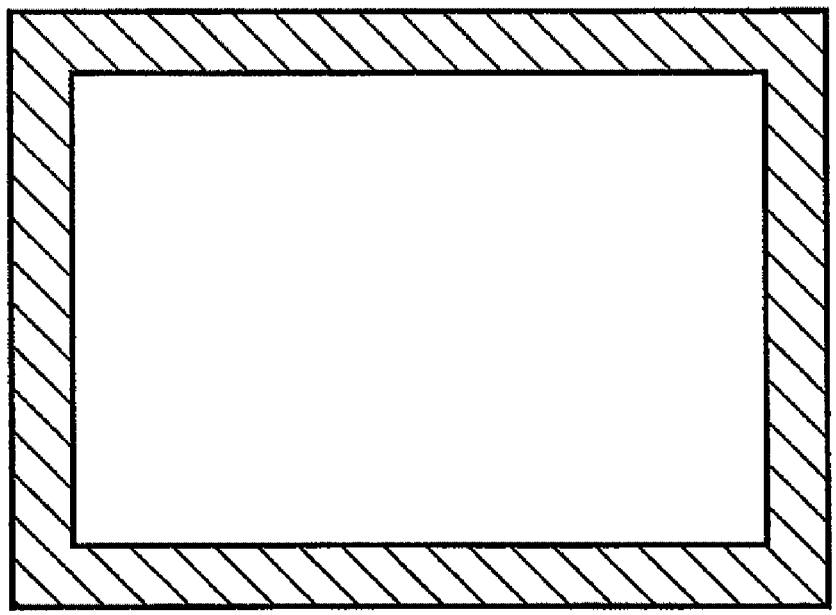

F I G. 10
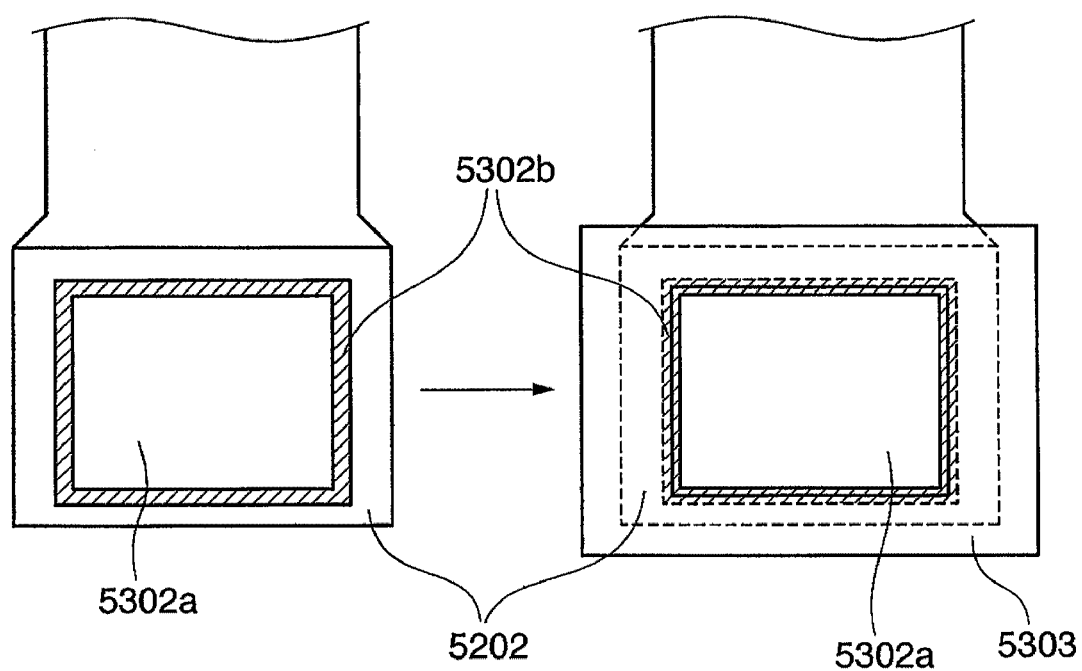

HEAD-MOUNTED DISPLAY AND HEAD-MOUNTED VIDEO DISPLAY

BACKGROUND OF THE INVENTION

1. Field of the Invention

The present invention relates to a head-mounted display which displays a video before the eyes of an observer.

2. Description of the Related Art

Recently, head-mounted video displays have been developed which enlarge video displayed on video display devices such as liquid crystal displays, display it before the eyes of an observer, and thereby allow the observer to watch large-screen video.

In a video display disclosed in Japanese Patent Laid-Open No. 11-174988, a pair of LCDs 3 corresponding to the left and right eyes of an observer are placed on the left and right inside an outer frame 2 of a device body 1 as shown in FIG. 6, where the LCDs 3 are two-dimensional video display devices. Backlights 4 are placed behind the respective LCDs 3 to illuminate the LCDs 3 and a pair of prisms 5 are placed below the LCDs 3 to project enlarged video from the LCDs 3 to both eyes E. The video displayed on the LCDs 3 is projected to both eyes E of the observer M along respective observation optical axes L and projected in front of both eyes E by being enlarged when passing through the prisms 5.

To provide a wide viewing angle to the observer, it is necessary to increase magnification of the prism. However, increases in the magnification of the prism make it difficult to maintain optical performance, resulting in marked chromatic aberration, field curvature, and other optical aberrations. Attempts to correct such aberrations properly result in a complicated, bulky optical system, making it difficult to mount the video display properly on the observer.

To deal with such situations, As being disclosed in Japanese Patent Laid-Open No. 5-127660, a technique, for adding distortion to video data before display by processing a video signal to be displayed so that the distortion will be cancelled out after passage through an optical system, is disclosed.

Also, an example disclosed in Japanese Patent Laid-Open No. 8-149393 proposes a configuration for displaying a black frame in peripheral portions to cancel out distortion in shape even though no distortion is added to video to be displayed. Although this configuration does not eliminate distortion in the displayed video, four sides of the peripheral frame appear to be straight and four corners appear to be square, reducing a sense of image distortion felt by the observer.

Also, Japanese Patent Laid-Open No. 2004-268638 discloses a configuration for a vehicle-mounted video display which projects video onto a front window of a vehicle, wherein frame members are arranged in such a way as to cancel out distortion caused by the front window. Also, with this configuration, although the displayed video remains distorted, four sides of the frame appear to be straight and four corners appear to be square, reducing a sense of image distortion felt by the observer.

However, with the technique disclosed in Japanese Patent Laid-Open No. 5-127660, video distorted by the optical system is observed outside a video-display area. Thus, the technique has a problem in that edges of the video-display area are distorted, resulting in degradation of video quality.

Also, the technique disclosed in Japanese Patent Laid-Open No. 8-149393, has a problem in that a corrective frame shape is displayed in the peripheral portions, reducing the number of display elements actually used for the video, which in turn results in low video resolution.

Also, the technique disclosed in Japanese Patent Laid-Open No. 2004-268638 presents a cost problem because frame members must be shaped to fit the front window of the vehicle on which the frame members are mounted, making it necessary to prepare multiple shapes.

On the other hand, if a visual field other than the video observed by the observer is darkened, the observer can view the video standing out in the visual field as if on a screen of a movie theater, increasing the quality of the observed video.

To provide such video, Japanese Patent No. 3485689 discloses a method for placing a viewing frame in front of a video display device to allow the observer to view video standing out in the visual field fitted entirely in a black frame as if on a screen of a movie theater.

However, with the technique disclosed in Japanese Patent No. 3485689, an aperture of the viewing frame is smaller than an effective display area of the liquid crystal display element, and consequently part of the video displayed on the liquid crystal display element is hidden by the viewing frame. With a configuration in which part of displayed video is hidden by the viewing frame in this way, the entire video is not shown to the observer. Take, for example, a PC monitor screen or the like; there can be a problem if part of video is not displayed. Also, Japanese Patent Laid-Open No. 5-127660 mentions nothing about positioning of viewing frames on the left and right display devices, and thus presents a problem of discrepancy between left and right video display areas.

SUMMARY OF THE INVENTION

The present invention has been made in view of the above circumstances and has an object to provide a technique for reducing a sense of strangeness (sense of distortion) felt by an observer to whom an image magnified by an optical system is presented.

Another object of the present invention is to prevent extra images other than displayed video to be observed in the visual field of an observer and thereby increase the quality of the displayed video.

According to one aspect of the present invention, a head-mounted display comprises:

a display which has a display screen, the display screen including a display area for displaying video and a frame area around the display area;

an optical system which enlarges the video displayed on the display screen and projects the enlarged video to the eyes of an observer who is wearing the head-mounted display on the observer's head; and a shield member which, being shaped like a frame, is superimposed over the display screen while being separated from the display screen by a distance L to shield the frame area, wherein the distance L satisfies $$L < 2 \times (B-A) \times f/D$$

where f is focal length of the optical system, D is a human pupil diameter determined statistically in advance, B is a width of the frame area, and A is a value statistically determined in advance as the width which will not be able to be shielded on a side of the frame area to be shielded by a side of the shield member.

According to another aspect of the present invention, a head-mounted video display comprises:

a video display device;

an ocular optical system which enlarges video displayed on the video display device and presents the enlarged video to an observer; and a shield member equipped with an aperture corresponding to a video display zone of the video display device and mounted between the video display device and the ocular optical system so as to prevent peripheries of the video display device from observing by the observer, wherein the video display device has, on a display surface thereof, the video display zone for displaying video according to a video signal and a frame zone which surrounds the video display zone and where contents to be displayed is not changed, and edges of the aperture of the shield member are provided within a width of the frame zone of the video display device.

Further features of the present invention will become apparent from the following description of exemplary embodiments with reference to the attached drawings.

BRIEF DESCRIPTION OF THE DRAWINGS

FIGS. 3A and 3B are diagrams illustrating a mechanism for correction of distortion aberration;

FIG. 7 is an exemplary external view of the shield member 501;

FIG. 10 is a diagram showing a configuration of a liquid crystal display element 5202;

DESCRIPTION OF THE EMBODIMENTS

Preferred embodiments of the present invention will be described in detail below with reference to the drawings. It should be noted, however, that the embodiments are described as examples of preferred configurations of the invention set forth in the appended claims and that the invention is not limited to the embodiments described below.

First Embodiment

Figure 1:
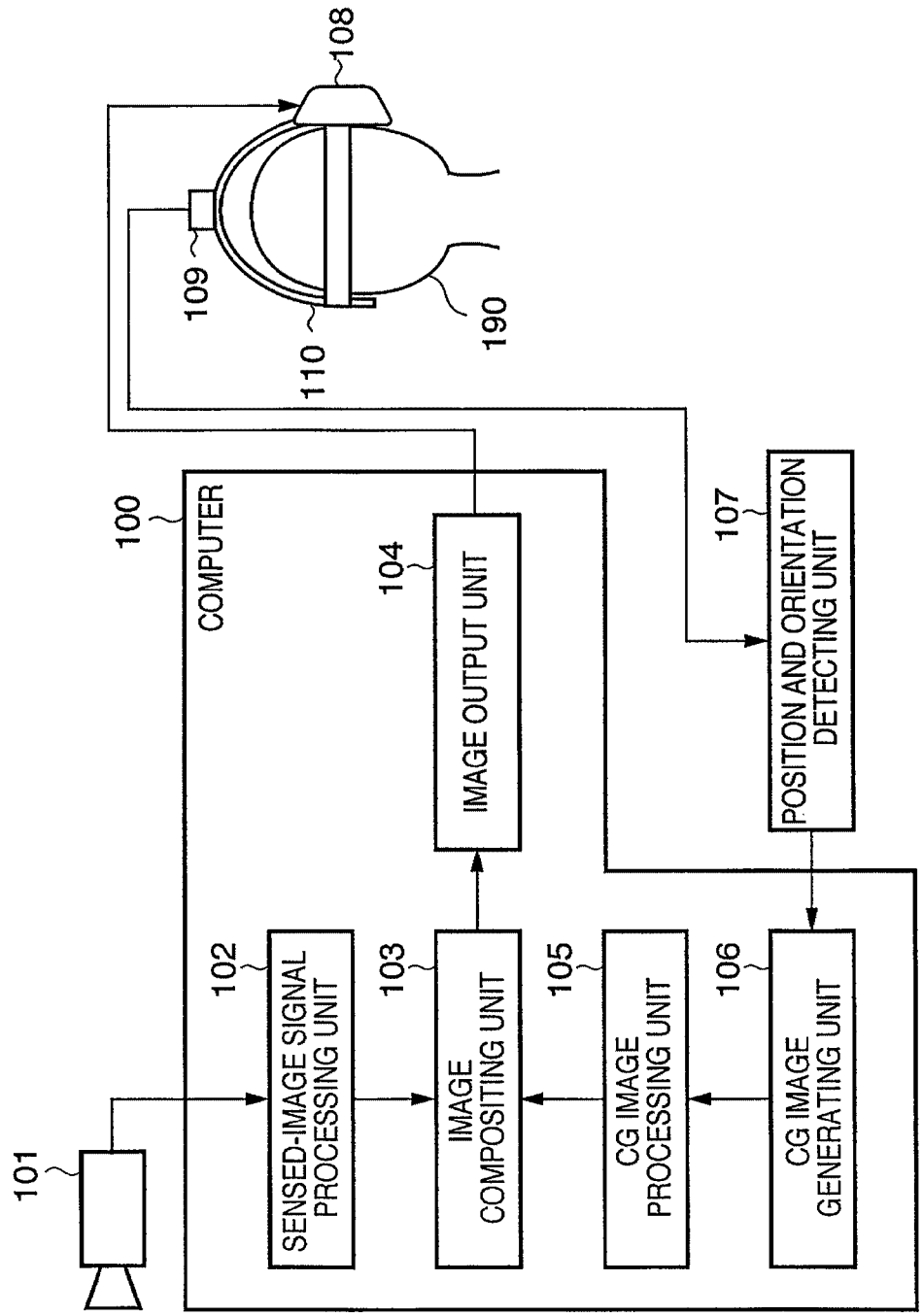
FIG. 1 is a block diagram showing a configuration example of a system resulting from application of a head-mounted display according to a first embodiment of the present invention.

FIG. 1 is a block diagram showing a configuration example of a system resulting from application of a head-mounted display according to this embodiment. The system according to this embodiment includes a camera 101, computer 100, a head-mounted display (HMD) 110, and position and orientation detecting unit 107.

The camera 101 is a video-capable camera which is used to capture movie of a physical space. It includes an image sensor such as a CCD and an imaging lens. Images (images of the physical space) of each frame captured by the camera 101 are input frame by frame into the computer 100. Noted that although the camera 101 and HMD 110 are illustrated as being separate in FIG. 1, actually the camera 101 is mounted on the HMD 110 in such a way that an imaging optical axis of the camera 101 will be parallel to a visual optical axis of an observer 190.

The HMD 110 is equipped with a sensor 109 to measure position and orientation of the HMD 110 itself. Preferably, the sensor 109 is mounted near the eyes of the observer 190 to measure position and orientation of the eyes of the observer 190. However, the sensor 109 may be mounted in any position as long as a relationship between the mounting position of the sensor 109 and positions of the observer's 190 eyes is known.

Reference numeral 108 denotes a display of the HMD 110.

The position and orientation detecting unit 107 sends out, as data, measurement result obtained by the sensor 109 to the computer 100. For example, if the sensor 109 is a magnetic sensor, the sensor 109 sends out, to the position and orientation detecting unit 107, a signal indicating its own position and orientation in a coordinate system (sensor coordinate system) which has an origin at a magnetic source (not shown) and whose x, y, and z axes intersect each other at right angles at the origin. The position and orientation detecting unit 107 calculates data indicating the position and orientation of the sensor 109 in the sensor coordinate system based on the signal and sends out the calculated data to the computer 100. Noted that a configuration used to send out, as data, measurement result obtained by the sensor to the computer 100 is known, and thus further description thereof will be omitted.

Next, the computer 100 will be described.

If the sensor 109 is mounted near the eyes of the observer 190, a CG image generating unit 106 generates an image (CG image) of a virtual space as seen from a viewpoint having position and orientation received from the position and orientation detecting unit 107.

On the other hand, if the sensor 109 is not mounted near the eyes of the observer 190, a relationship between the mounting position of the sensor 109 and the position of the observer's (190) eyes must be known. In that case, the CG image generating unit 106 determines the position and orientation of the observer's eyes by converting the position and orientation received from the position and orientation detecting unit 107 based on this relationship and generates an image (CG image) of the virtual space as seen from a viewpoint having the position and orientation determined in this way.

Note that a process performed by the CG image generating unit 106 to generate an image of the virtual space as seen from a viewpoint having a given position and orientation is known, and thus further description thereof will be omitted.

A CG image processing unit 105 converts a format of the image generated by the CG image generating unit 106 into a format supported by an image compositing unit 103. Subsequently, the CG image processing unit 105 sends out the resulting CG image to the image compositing unit 103 downstream.

On the other hand, a sensed-image signal processing unit 102 converts a format of an image of the physical space received from the camera 101 into a format supported by the image compositing unit 103 and sends out the resulting image to the image compositing unit 103 downstream.

The image compositing unit 103 generates a composite image by composing the image of the virtual space received from the CG image processing unit 105 on the image of the physical space received from the sensed-image signal processing unit 102. Note that various techniques for composing the image of the physical space and CG image are available, and whatever technique may be used, there is practically no difference in the following description.

The image compositing unit 103 sends out the composite image to an image output unit 104. The image output unit 104 converts a format of the composite image into a format supported by the display 108 and sends out a resulting image signal to the display 108. Consequently, the display 108 displays an image (the composite image generated by the image compositing unit 103) based on the image signal on its display screen.

Figure 2:
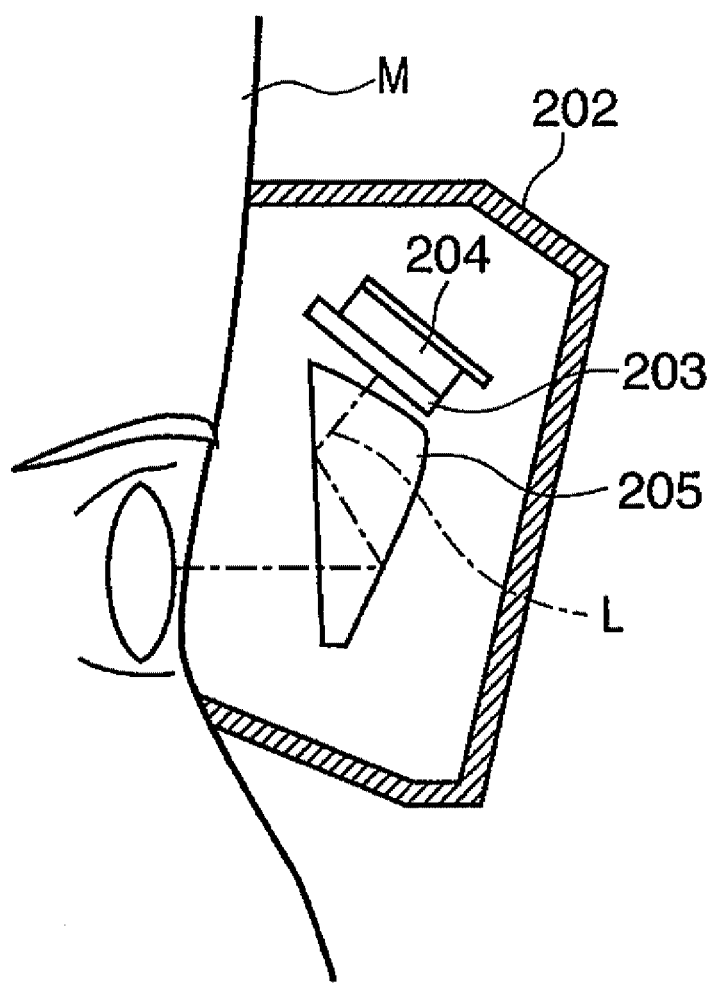
FIG. 2 is a sectional view of a display 108 taken along a plane parallel to an optical axis.

FIG. 2 is a sectional view of the display 108 taken along a plane parallel to an optical axis.

LCDs (liquid crystal displays) 203 corresponding to the left and right eyes of an observer 190 are placed on the left and right inside an outer frame 202 of the display 108, where the LCDs 203 are two-dimensional video display devices. Backlights 204 are placed behind the respective LCDs 203 to illuminate the LCDs 203 and prisms 205 are placed below the LCDs 203 to project enlarged video from the LCDs 203 to both eyes E. The videos displayed on the LCDs 203 are led to both eyes E of the observer M along respective observation optical axes L and projected in front of both eyes E by being enlarged when passing through the prisms 205.

When magnification of the prisms 205 reaches or exceeds a certain level, it becomes difficult to correct optical aberrations using the prisms 205 alone.

Optical aberrations include chromatic aberration, field curvature, astigmatic aberration, and distortion. It is very difficult from a design standpoint to remove the aberrations completely. Besides, such attempts will complicate lens configuration, increase overall equipment size, and incur cost increases.

To deal with this situation, a possible design technique involves focusing on correction of chromatic aberration, field curvature, and the like instead of devoting optical-system design to correction of all the aberrations. For example, distortion aberration is dealt with as follows. The videos displayed on the LCDs 203 are distorted so as to correct the distortion aberration in reverse. This allows the observer 190 to view video free of distortion aberration.

FIGS. 3A and 3B are diagrams illustrating a mechanism for correction of distortion aberration. If an image represented by a grid as shown on the left of FIG. 3A is displayed as it is on the LCDs 203, the image which reaches the eye of the observer 190 via the prism 205 is distorted as shown on the right of FIG. 3A. This is caused by distortion characteristics of the optical system including the prism 205.

Thus, with regard to the distortion characteristics, as shown on the left of FIG. 3B, when displaying an image distorted as to correct the distortion aberration of the optical system in reverse on the LCDs 203, the image shown on the right of FIG. 3B reaches the eye of the observer 190 via the prism 205. This is the image originally desired to be displayed as shown on the left of FIG. 3A.

Next, description will be given of a technique for presenting a good image with a reduced sense of distortion to the observer 190, four sides of the frame of the presented image are straight and four corners of that are square.

Figure 4:
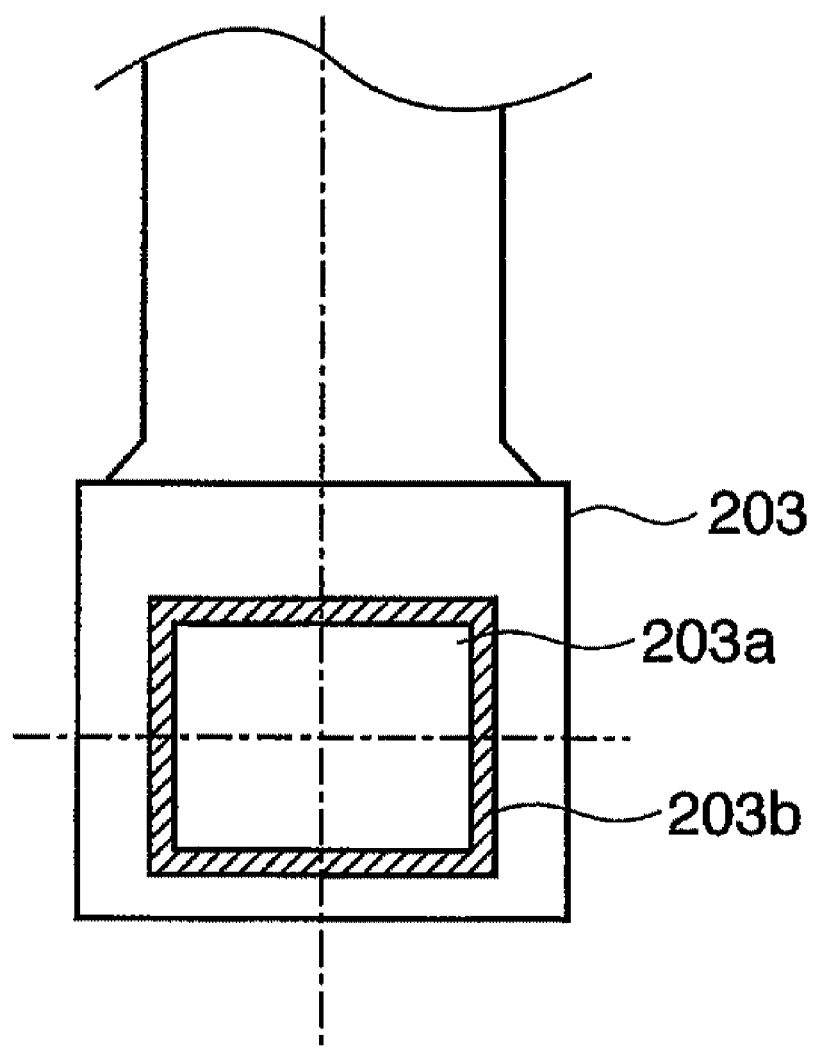
FIG. 4 is a diagram showing a configuration example of an LCD 203.

FIG. 4 is a diagram showing a configuration example of the LCD 203. As shown in the FIG. 4, a display screen of the LCD 203 has a display area 203a for displaying video and a frame area 203b. located around the display area 203a. Various areas of the LCD 203 contain groups of video display elements, and an image based on the image signal output from the image output unit 104 is displayed in the display area 203a.

On the other hand, the frame area 203b always displays nothing. "Displaying nothing" is assumed to be equivalent to "presenting a black display." The frame area 203b is formed in the same fabrication process as the display area 203a, but a polarization axis of liquid crystals is fixed to always provide a black display, and the direction of polarization does not change even if a voltage is applied. Also, there are transistors and other electronic circuits outside the frame area 203b, and signal transmission cables are wire-bonded. The shape of edges of the frame area 203b and the outside are straight, but a distorted frame shape is observed after passage through an optical system with distortion aberration.

Consequently, as being disclosed in Japanese Patent Laid-Open No. 5-127660, even if a video which cancels out the distortion of the optical system is displayed in the video display area, an area which corresponds to the frame of the video display area appears to have a distorted shape.

Similarly, as being disclosed in Japanese Patent Laid-Open No. 8-149393, even if a corrective frame shape is displayed, the electronic circuits and the like outside the corrective frame shape are observed to be distorted. Additionally, since the frame shape is displayed in the video display area, the number of display elements actually used for the video is reduced, resulting in lower video resolution.

According to this embodiment, in order to improve video quality while maintaining the resolution of the video displayed in the display areas 203a, shield members are superimposed over the LCDs 203 in the display 108. In so doing, the shield members and respective LCDs 203 are separated by some distance. Each shield member is shaped like a frame and designed to allow the display area 203a to be seen through an inside of the frame. That is, the shield member is mounted so as to shield the frame area 203b and its surroundings. The shield member is rectangular in shape.

However, the shield member may be distorted; that is, distorted in such a way as to inversely correct the distortion aberration of the optical system. In that case, when the observer 190 views the shield member via the optical system, each side of the inner edges of the shield member appears to be configured with straight lines and the four corners formed by the edges appear to be square. Consequently, the observer 190 sees an image through an area surrounded by the inner edges of the frame whose four sides are straight, forming four square corners.

FIG. 7 is an exemplary external view of the shield member 501. The shield member 501, which is marked with diagonal lines in the figure, shields the frame area 203b and its surroundings. The shield member has an aperture of a size described later with reference to FIG. 5. Width of the shield member is such that the shield member will not stick out of the LCD 203.

This reduces design burden and provides cost benefits because it is necessary to create only a shield member of a shape suitable for the optical system instead of creating shield members of multiple shapes, which is the case with the configuration disclosed in Japanese Patent Laid-Open No. 2004-268638.

Also, since such a shield member is mounted to shield the frame area 203b and its surroundings, the frame area 203b and its surroundings are not visible and therefore, distorted video is not seen. This makes it possible to provide high quality images.

However, if the shield member is placed in such a way that its inner edges will cover part of the display area 203a, the video displayed in the display area 203a is partially hidden, degrading the quality of the video presented to the observer 190. On the other hand, if the surroundings of the display area 203a are not shielded completely by the shield member, circuits and the like become visible, also degrading the quality of the video.

Thus, the shield member needs to be mounted in such a way that the inner edges of the shield member will not cover any part of the display area 203a and that the surroundings of the display area 203a will be shielded completely. However, when the shield member is mass-produced, there are variations in inner and outer lengths and breadths of the shield member.

In view of the above points, according to this embodiment, the shield member is mounted on the LCD 203 in such a way that the inner edges of the mass-produced shield member will not cover any part of the display area 203a and that the surroundings of the display area 203a can be shielded completely.

Figure 5:
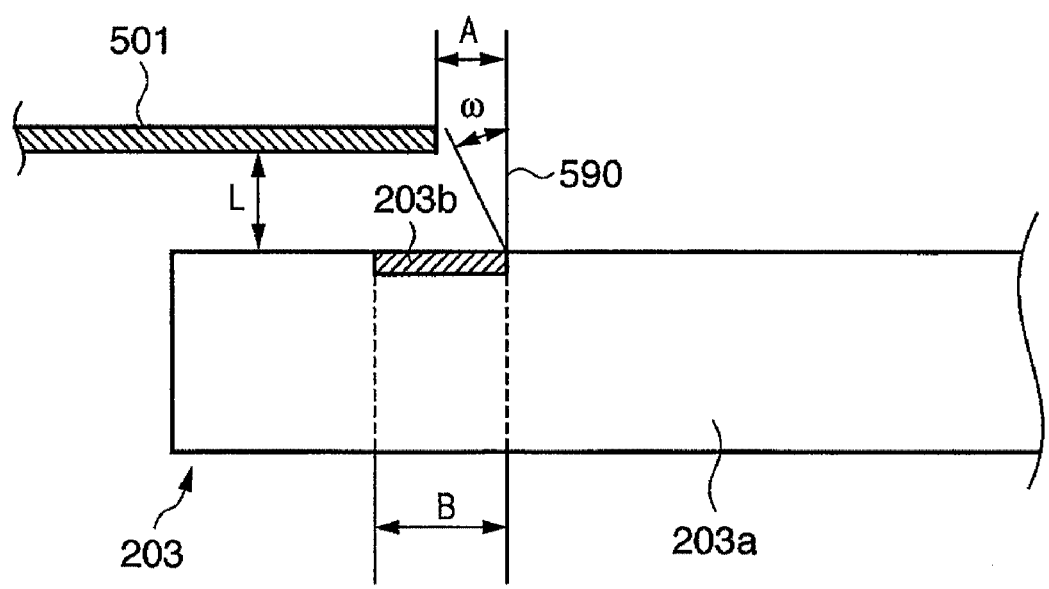
FIG. 5 is a sectional view of the LCD 203 and a shield member 501.
Figure 6:
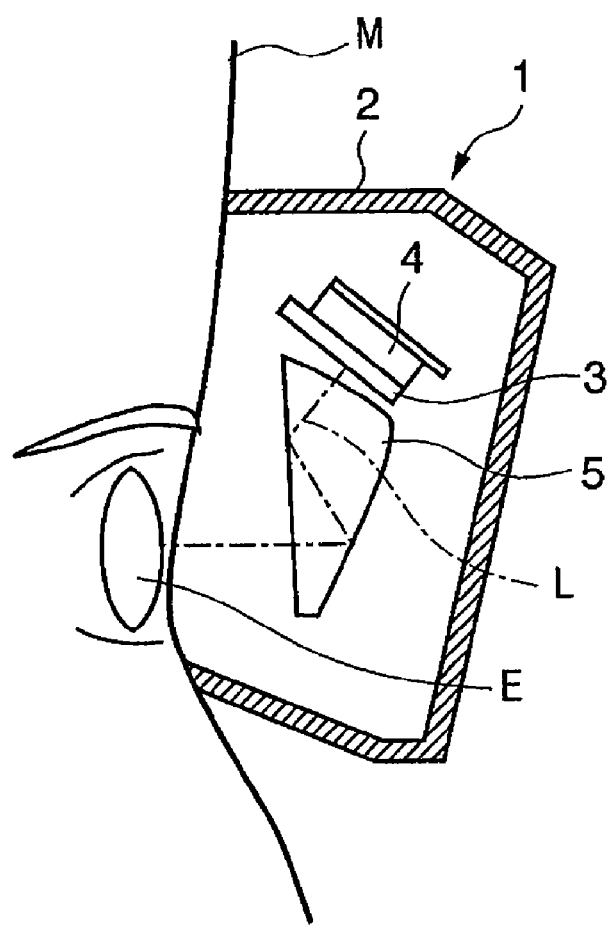
FIG. 6 is a diagram showing a configuration example of a conventional head-mounted display.

FIG. 5 is a sectional view of the LCD 203 and shield member 501. It is assumed that light which represents an image is radiated upward from the bottom, in the FIG. 5. Noted that, let ω denote a radiation angle of light from a video display surface of a liquid crystal display element at a boundary location between the display area 203a and frame area 203b (i.e., an angle with respect to the video display surface), let f denote focal length of the optical system, and let D denote human pupil diameter determined statistically in advance, the following equation is satisfied.

$$D/2 = f \times \tan \omega \quad \text{(Eq. 1)}$$

According to this embodiment, a distance L between the shield member 501 and LCD 203 is determined such that a beam (luminous flux) emitted from the video display surface of a liquid crystal display element at the boundary location will reach the optical system without colliding with the shield member 501.

Let A denote a difference between the inner edges of the shield member 501 and the boundary location. Such a difference A is set to an optimum value by taking into consideration a balance between cost and yield. Thus, the difference A may be a value determined statistically in advance as a width which will not be able to be shielded on a side of the frame area 203b to be shielded by a side of the shield member 501. Also, let B denote a width of the frame area 203b. The width B falls within a range which can be formed by a semiconductor exposure device and has little variation in its value.

In this case, if the shield member 501 is installed at a location separated from the LCD 203 by a distance L which satisfies the following equation, the beam (luminous flux) radiated from the video display surface of the liquid crystal display element at the boundary location can reach the optical system without colliding with the shield member 501. This eliminates the possibility that the inner edges of the shield member 501 will enter the display area 203a even if there is variation during mass production, and thus can reduce a fraction defective in mass production.

$$L \times \tan \omega < B - A \quad \text{(Eq. 2)}$$

By combining Eqs. 1 and 2, following equation is obtained.

$$L < 2 \times (B-A) \times f/D \quad \text{(Eq. 3)}$$

Thus, a value of L which satisfies Eq. 3 is determined and the shield member 501 is installed at a location separated from the display surface of the LCD 203 by the determined value of L.

Noted that, although an HMD (head-mounted display) is used as the head-mounted display according to this embodiment, this is not restrictive and the present invention is applicable to any display which presents images before the eyes of an observer. Also, although it has been stated above that composite images are displayed on the LCDs 203, information displayed on the LCDs 203 is not limited to composite images.

As described above, this embodiment makes it possible to mount a shield member which shields surroundings of the display area 203a without blocking the images displayed in the display area 203a. Also, by determining the mounting position based on the value of L in Eq. 3 above, it is possible to eliminate the possibility that the inner edges of the shield member will enter the display area 203a even if there is variation during mass production of the shield member, and can thus reduce the fraction found defective in mass production.

Furthermore, it is possible to make the observer recognize the four sides of the image displayed in the display area 203a as being straight lines, and the four corners of the image as being square, and thus present a good image with a reduced sense of distortion to the observer.

Second Embodiment

Figure 8:
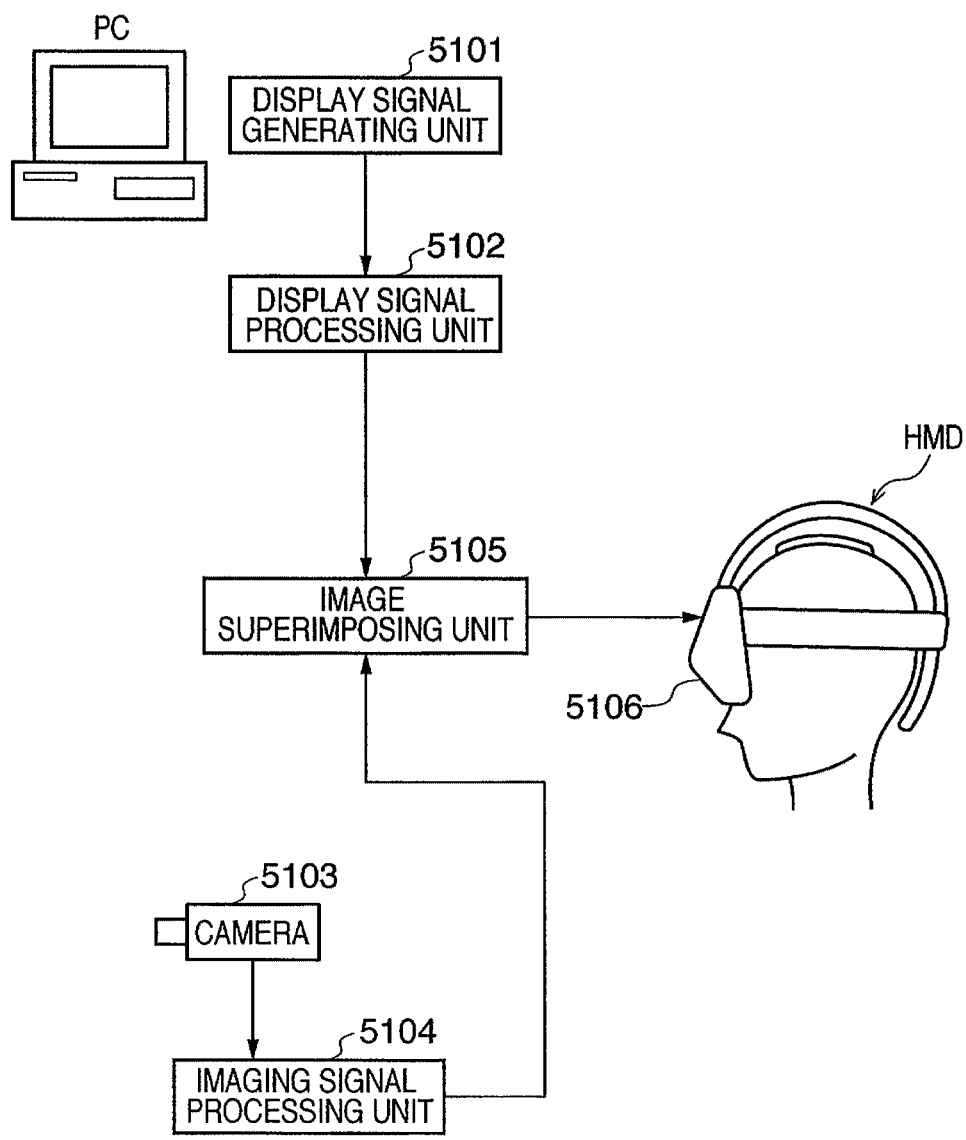
FIG. 8 is a block diagram showing a configuration example of a video display according to a second embodiment of the present invention.

FIG. 8 is a block diagram showing a configuration example of a video display according to a second embodiment of the present invention. A display signal generating unit 5101 generates video signal, such as a CG and the like, to be displayed on a video display unit (head-mount display (HMD) 5106, according to this embodiment). Generally, the display signal generating unit 5101 comprises a computer such as PC or the like. The display signal generated by the display signal generating unit 5101 is sent to a display signal processing unit 5102 and converted thereby into signal format which can be transmitted to a main body of the HMD 5106.

An imaging camera 5103 includes an image sensor such as a CCD and an imaging lens and shoots video of the outside world. An imaging direction of the imaging camera 5103 is designed to roughly coincide with a line-of-sight direction of the observer to provide a video along the same line of sight as the observer. The video shot by the imaging camera 5103 is sent to an imaging signal processing unit 5104 and converted thereby into a format which can be displayed on the video display unit in the HMD 5106.

The image generated by the display signal generating unit 5101 and the image shot by the imaging camera 5103 are superimposed by an image superimposing unit 5105 and displayed on the video display unit in the main body of the HMD 5106.

Figure 9:
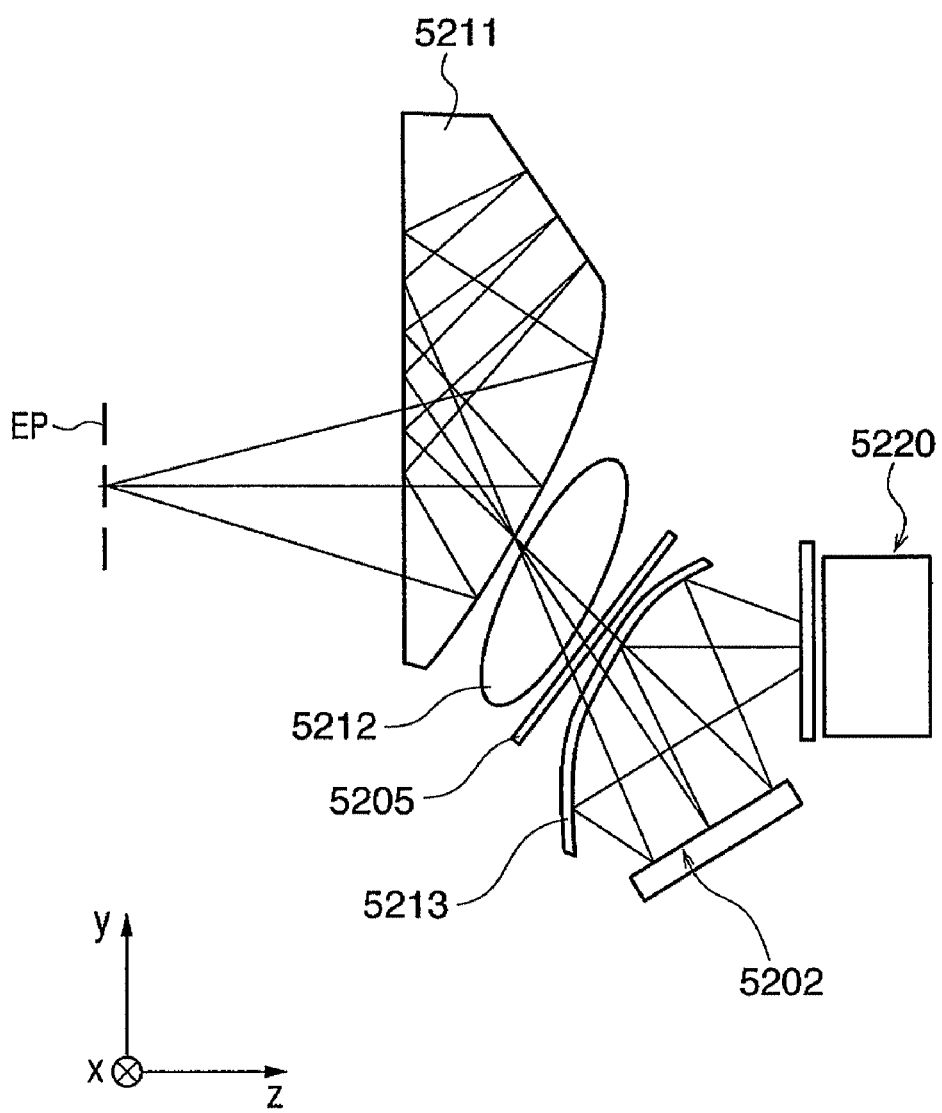
FIG. 9 is a sectional view of a video display unit of the HMD 5106 according to the second embodiment of the present invention taken along a plane parallel to an optical axis.

FIG. 9 is a sectional view of the video display unit of the HMD 5106 according to this embodiment taken along a plane parallel to an optical axis. In FIG. 9, a liquid crystal display element 5202 is a reflective liquid crystal element which displays two-dimensional video by reflecting an incident linearly polarized beam so as to change its polarization direction. A light source unit 5220 functions as a light source which illuminates the reflective polarized liquid crystal display element 5202. A beam emitted from the light source unit 5220 is reflected by a half mirror 5213 and enters the liquid crystal display element 5202. The reflective liquid crystal display element 5202 reflects incident light by changing the polarization direction of the incident light based on the displayed video information. The beam reflected by the liquid crystal display element 5202 becomes observable video after passing through the half mirror 5213 again and then through a polarizing plate 5205. After passing through the polarizing plate 5205, the beam is enlarged by a lens 5212 and ocular prism 5211 and emitted to the eye EP of an observer. That is, the polarizing plate 5205, lens 5212, and ocular prism 5211 constitute an ocular optical system which enlarges the video displayed on the liquid crystal display element 5202 and presents it to an observer.

FIG. 10 is a diagram showing a configuration of the liquid crystal display element 5202 according to the present embodiment. On a display surface of the liquid crystal display element 5202, there is a video display zone 5302a which displays video (images) corresponding to an input video signal. Also, outside the video display zone 5302a on the display surface, there is a frame zone 5302b which surrounds the video display zone 5302a and whose display mode does not change. According to this embodiment, the frame zone 5302b is normally in black display mode. That is, the frame zone 5302b is formed in the same fabrication process as the video display zone 5302a, but a polarization axis of liquid crystals is fixed to always provide a black display, and the direction of polarization does not change even if a voltage is applied.

Also, there are transistors and other electronic circuits outside the frame zone 5302b, and signal transmission cables are wire-bonded. To hide the electronic circuits and wire-bonding around the liquid crystal display element 5202 from the observer, a mask 5303 is placed on the liquid crystal display element 5202. The mask 5303 has an aperture corresponding to the video display zone of the liquid crystal display element and functions as a shield member installed between the ocular optical system to hide peripheries of the liquid crystal display element 5202 from the observer. Noted that, according to this embodiment, since the frame zone 5302b is displayed in black, the mask 5303 is coated black at least on the side facing the ocular optical system. Colors of the frame and the mask 5303 may be approximately equal, and are not limited to black.

As described above, with the conventional example disclosed in Japanese Patent No. 3485689, the mask 5303 in FIG. 10 is formed slightly smaller than the video display zone 5302a. Consequently, edges of displayed video are observed by being curtailed slightly. When viewing a movie or the like, it does not matter if the edges of displayed video are curtailed slightly. However, in the case of a PC monitor or the like, since icons and a tool bar may be placed on the edges of displayed video, it is problematic if the edges of displayed video are curtailed.

Thus, by fitting the edges of the mask 5303 placed on the liquid crystal display element 5202 within the width of the frame zone 5302b of the liquid crystal display element 5202, this embodiment allows good video to be observed without being curtailed the edges of the video. However, the frame zone 5302b of the liquid crystal display element 5202 is useless for display. Also, the manufacturing cost of the liquid crystal display element 5202 depends heavily on its size. Therefore, it is desirable to minimize the size of the liquid crystal display element 5202. Thus, the frame zone 5302b is set to be very narrow in width.

Figure 11:
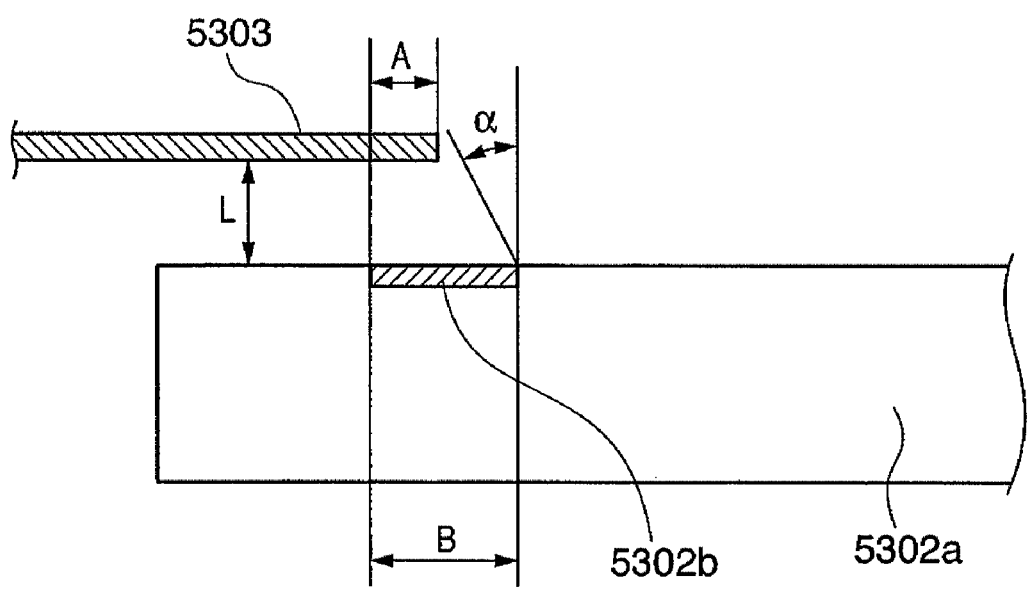
FIG. 11 is a sectional view of the liquid crystal display element 5202 and a mask 5303.

FIG. 11 is a sectional view of the liquid crystal display element 5202 and mask 5303 according to this embodiment. The observer observes video enlarged by the ocular optical system and the beam radiated from the liquid crystal display element 5202 has a radiation angle α appropriate for magnification of the ocular optical system.

Consequently, depending on positional relationship between the mask 5303 and liquid crystal display element 5202, the beam radiated from the display edges of the liquid crystal display element 5202 can cover the edges of the mask 5303, hiding edges of the video. On the other hand, if the frame zone 5302b is provided with a wide aperture so as not to hide an optical axis of radiation, the electronic circuits and wire-bonding outside the liquid crystal display element 5202 may become visible.

A relationship represented by Eq. 4 holds among the radiation angle α from the liquid crystal display element 5202, focal length f of the ocular optical system, and pupil diameter D.

$$D/2 = f \times \tan \alpha \quad \text{(Eq. 4)}$$

Therefore, the mask 5303 should be placed on the liquid crystal display element 5202 in such a way as not to hide the beam radiated at the radiation angle α, but since the mask 5303 is mass-produced, there is variation in the edge position in the aperture of the mask 5303. Thus, it is necessary to determine a placement location of the mask 5303 by taking into consideration the variation in the mask 5303.

For example, the luminous flux radiated at the radiation angle α expands if increasing in distance L from the video display surface of the liquid crystal display element 5202 to the mask 5303, making it necessary to enlarge the aperture of the mask 5303. This makes the aperture of the mask 5303 larger than the frame zone 5302b, revealing the electronic circuits and wire-bonding present outside the liquid crystal display element 5202. Thus, the mask 5303 should be placed at less than a certain distance from the video display surface of the liquid crystal display element 5202.

Let A denote an amount of variation in the aperture of the mask 5303. The amount A of variation is set to an optimum value by taking into consideration a balance between cost and yield. Let B denote width of the frame zone 5302b which is on the liquid crystal display element 5202 and does not display video. The width B of the frame zone 5302b falls within a range which can be formed by a semiconductor exposure device and has little variation in its value. Let L denote spacing between the mask 5303 and the video display surface of the liquid crystal display element 5202.

When Eq. 5 below is satisfied, the luminous flux emitted from edges of the video display zone 5302a of the liquid crystal display element 5202 stays clear of the edges of the aperture of the mask 5303 and thus good video can be observed.

$$L \times \tan \alpha < B - A \quad (5)$$

By combining Eqs. 4 and 5, following equation is obtained.

$$L < 2 \times (B-A) \times f/D \quad (6)$$

If the mask 5303 is placed within a distance "$2 \times (B-A) \times f/D$" specified by Eq. 6, there is no possibility that the edges of the aperture of the mask 5303 will enter the display area even if there is variation during mass production. This reduces the fraction defective in mass production, and thus helps reduce cost.

As described above, this embodiment makes it possible to view the entire screen properly without loss to effective part of displayed video in a head-mounted display because the edges of the masks are placed within the width of the frame zones around the effective display zones of the video display devices.

Third Embodiment

Next, a third embodiment will be described with reference to FIGS. 12 and 13, wherein the same components as those in the second embodiment will be denoted by the same reference numerals as the corresponding components in the second embodiment, and description thereof will be omitted.

In a head-mounted video display, the observer will feel discomfort if left and right optical axes to be observed do not match with high accuracy. Therefore, assembly of the head-mounted video display needs an adjustment process to match the left and right optical axes. In the adjustment process, it is common practice to adjust the left and right liquid crystal display elements 5202 separately, thereby causing video to be observed to match an adjustment index. Thus, effective diameter of the ocular optical system is set to allow for adjustment margins of the liquid crystal display elements 5202.

However, such adjustment margins cause an increase in the size of the ocular optical system, and thus the size of the entire video display. Generally, in head-mounted video displays reduction in size and weight is a matter of the highest priority. Thus, needless to say, it is desirable that adjustment margins such as described above are made small when designing the main body of the video display.

Figure 12:
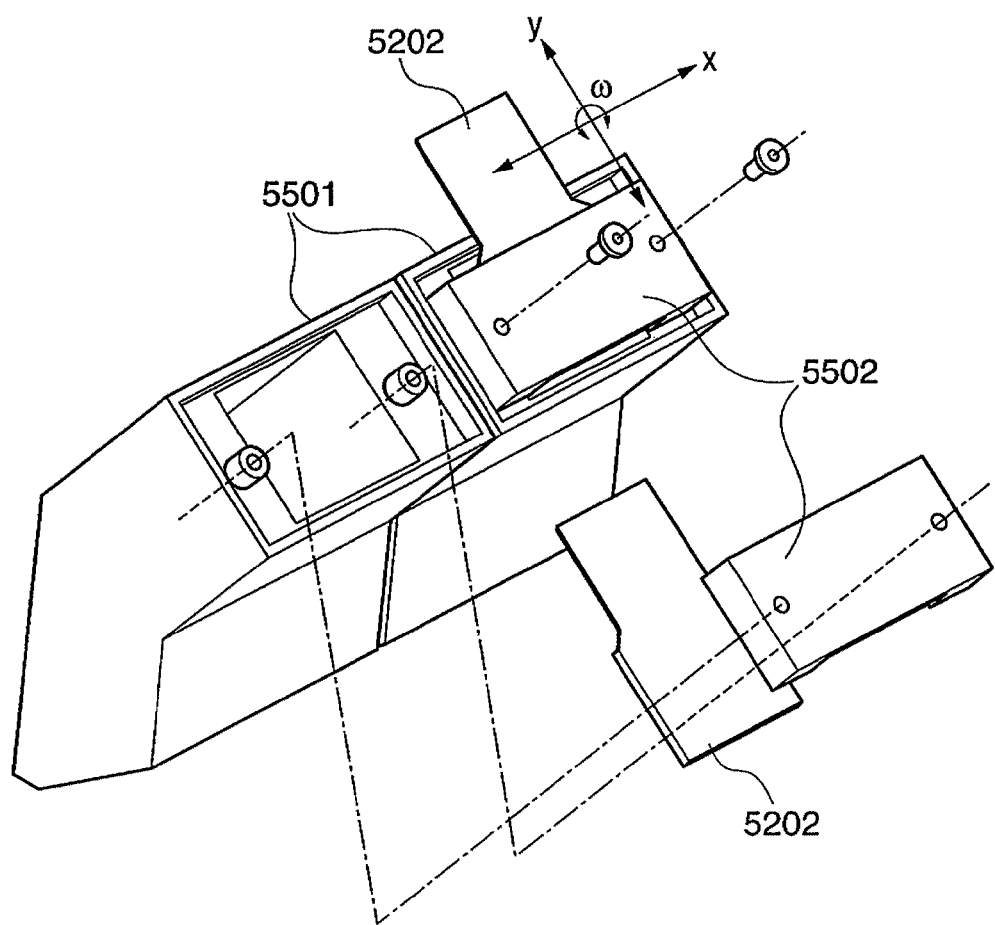
FIG. 12 is an exploded perspective view of an optical unit of a video display according to a third embodiment of the present invention.

FIG. 12 is an exploded perspective view of an optical unit of the video display according to this embodiment. In FIG. 12, the liquid crystal display element 5202 is fastened to a holding member 5502. The holding member 5502 with the liquid crystal display element 5202 fastened is mounted on an optical unit 5501 which houses an ocular optical system. According to this embodiment, when mounting the liquid crystal display element 5202 on the holding member 5502, position adjustments are made corresponding to around X, Y, and ω axes shown in FIG. 12. Thus, adjustment fixations around the X, Y, and ω axes are achieved by mounting the holding member 5502 with the liquid crystal display element 5202 fastened. This either makes it unnecessary to adjust the optical axes of the liquid crystal display element 5202 or reduces the degree of adjustment required.

Figure 13:
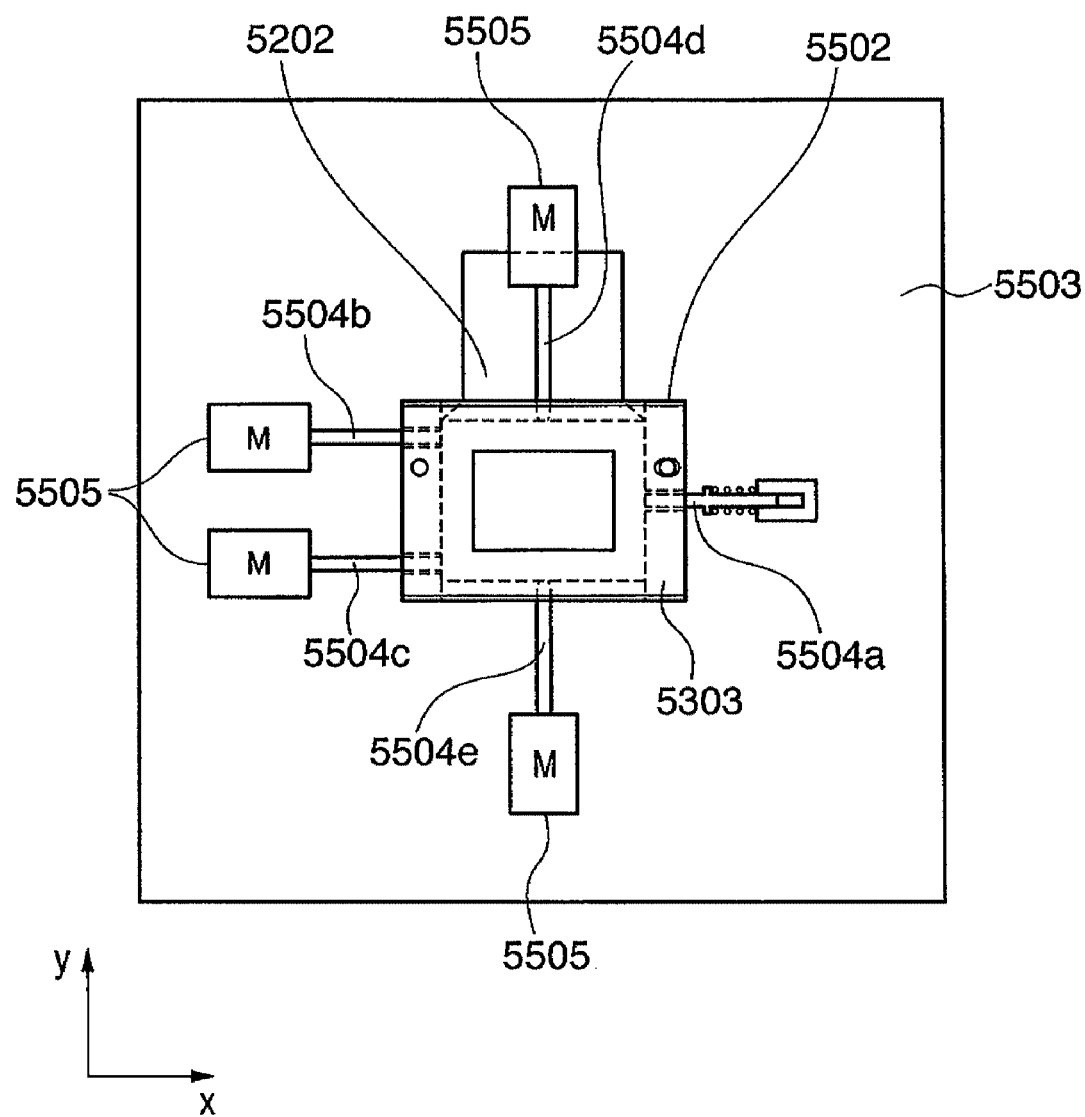
FIG. 13 is a schematic view showing how the liquid crystal display element 5202 is adjusted and fastened to a holding member 5502.

FIG. 13 is a schematic view showing how the liquid crystal display element 5202 is adjusted and fastened to the holding member 5502. Noted that, the mask 5303 is fastened to the holding member 5502 using a dedicated jig or the like in such a way that the aperture of the mask 5303 will be put in place with respect to the holding member 5502. The holding member 5502 with the mask 5303 fastened is placed on an adjustment stand 5503 and fastened to it.

The adjustment stand 5503 has three adjustment pins 5504a, 5504b, and 5504c in the X-axis direction and two adjustment pins 5504d and 5504e in the Y-axis direction. The liquid crystal display element 5202 is fastened with these pins.

Of the three adjustment pins in the X-axis direction, the adjustment pin 5504a on the right side is spring-loaded and pressed against the direction of the remaining two pins. The two adjustment pins 5504b, 5504c on the left are connected with micrometers 5505 and the micrometers 5505 is used for making position adjustments of the liquid crystal display element 5202 in the X-axis direction and rotation adjustments of the liquid crystal display element 5202.

On the other hand, the two adjustment pins 5504d and 5504e in the Y-axis direction are used for position adjustments of the liquid crystal display element 5202 in the up-and-down direction (Y-axis direction). That is, the adjustment pins 5504d and 5504e are also connected with micrometers 5505 and the adjustment of the liquid crystal display element 5202 in the up-and-down direction can be done by using the micrometers 5505.

After going through shift adjustments in the X- and Y-axis directions and rotation adjustments around the ω axis by means of the adjustment pins 5504a to 5504e, the liquid crystal display element 5202 is fastened to the holding member 5502. Through these adjustments, the adjustment of the optical axis of the liquid crystal display element 5202 as well as the adjustment of the positional relationship between the aperture of the mask 5303 and the frame zone 5302b of the liquid crystal display element 5202 are achieved (the edges of the aperture of the mask 5303 are placed within the width of the frame zone 5302b). Note that, the positional relationship represented by Eq. 6 according to the second embodiment, that is, the relationship between the display surface of the liquid crystal display element 5202 and the edges of the aperture of the mask 5303 in terms of height, is satisfied by fastening the mask 5303 and liquid crystal display element 5202 to the holding member 5502. That is, the holding member 5502 has been processed with such accuracy as to satisfy this positional relationship.

As described above, according to this embodiment, the liquid crystal display element 5202 is adjusted and fastened to the holding member 5502. Consequently, when the holding member 5502 is mounted on the optical unit 5501, the liquid crystal display element 5202 has already been mounted on its designated position, eliminating the need to consider variation in center position of the liquid crystal display element 5202 and making it possible to reduce adjustment margins. The reduction in the adjustment margins makes it possible to reduce the effective diameter of the ocular optical system and thereby downsize the optical unit 5501. The downsizing of the optical unit 5501 eventually makes it possible to downsize the entire head-mounted video display.

Furthermore, by reducing tolerances of a part where the holding member 5502 is mounted on the optical unit 5501, it is possible to eliminate position adjustments of the liquid crystal display after installation on the optical unit 5501, reductions of adjustment process steps and cost are expected. Also, according to this embodiment, after the mask 5303 is positioned on the holding member 5502 to which the liquid crystal display element 5202 is fastened, the liquid crystal display element is adjusted and fastened to the shield member. This makes it possible to easily and reliably satisfy the positional relationship represented by Eq. 6 according to the second embodiment; that is, the positional relationship between the aperture of the mask 5303 and the frame zone 5302b of the liquid crystal display element 5202.

Although a method for adjusting the liquid crystal display element 5202 by means of the adjustment pins 5504a to 5504e has been described in this embodiment, the present invention is not limited to this method and it goes without saying that position adjustments of the liquid crystal display element 5202 may be made using other methods.

As described above, according to each of above described embodiments, the liquid crystal display element 5202 has, on its display surface, the video display zone which displays video according to a video signal and the frame zone which surrounds the video display zone and whose display mode does not change. The edges of the aperture of the mask 5303 are placed within the width of the frame zone on the display surface of the liquid crystal display element 5202. Consequently, the electronic circuits and wire-bonding, which are present outside portion of the display surface of the liquid crystal display element 5202, are hidden by the mask 5303, making it possible to provide good quality video to the observer.

Also, according to this embodiment, the liquid crystal display element 5202 is adjusted and fastened to the mask 5303 after the mask 5303 is positioned and fastened to the holding member 5502 which holds the liquid crystal display element 5202. This makes it possible to reduce allowance (adjustment margins) of the ocular optical system, and thereby reduce the overall size and weight of the video display.

Furthermore, according to the second embodiment, the spacing between the position of the edges of the mask 5303 and the position of the display surface of the liquid crystal display element 5202 is set smaller than a value given by $$2\times(B-A)\times f/D$$

where A is the amount of variation in the edge of the aperture of the mask 5303, B is the width of the frame zone of the liquid crystal display element 5202, f is the focal length of the optical system, and D is the pupil diameter. This eliminates the possibility that the edges of the mask 5303 will enter the video display zone 5302a of the liquid crystal display element 5202 even if there is variation during mass production, and thereby reduces a fraction defective during mass production.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-039820 filed Feb. 20, 2007 and Japanese Patent Application No. 2007-089043 filed Mar. 29, 2007 which are hereby incorporated by reference herein in their entirety.

What is claimed is:

1. A head-mounted display comprising:
a display which has a display screen, the display screen including a display area for displaying video and a frame area around the display area;
an optical system which enlarges the video displayed on the display screen and projects the enlarged video to the eyes of an observer who is wearing the head-mounted display on the observer's head; and
a shield member which, being shaped like a frame, is superimposed over the display screen while being separated from the display screen by a distance L to shield the frame area, wherein
the distance L satisfies $$L<2\times (B\text{-}A)\times f/D$$

where f is focal length of said optical system, D is a human pupil diameter determined statistically in advance, B is a width of the frame area, and A is a value statistically determined in advance as the width which will not be able to be shielded on a side of said frame area to be shielded by a side of said shield member.

2. The head-mounted display according to claim 1, wherein the frame area is an area where black color is always displayed.

3. The head-mounted display according to claim 1, wherein said shield member is distorted so as to correct distortion aberration involved in said optical system in reverse.

4. A head-mounted video display comprising:
a video display device;
an ocular optical system which enlarges video displayed on said video display device and presents the enlarged video to an observer; and
a shield member equipped with an aperture corresponding to a video display zone of said video display device and mounted between said video display device and said ocular optical system so as to prevent peripheries of said video display device from observing by the observer,
wherein said video display device has, on a display surface thereof, the video display zone for displaying video according to a video signal and a frame zone which surrounds the video display zone and where contents to be displayed is not changed, and
edges of the aperture of said shield member are provided within a width of the frame zone of said video display device wherein said shield member and said video display device are placed such that a distance between said shield member and said video display device will be smaller than a value given by 2× (B-A) x f/D where A is an amount of variation of locations of the edges of said aperture of said shield member, B is a width of the frame zone of said video display device, f is a focal length of said ocular optical system, and D is a pupil diameter.

5. The head-mounted video display according to claim 4, wherein:
said video display device is a liquid crystal display element and the frame zone is always in black display mode; and
a surface of said shield member at least on a side facing said ocular optical system is black in color.

* * * * *